H. PETIT.
SPEED INDICATING DEVICE.
APPLICATION FILED AUG. 25, 1917.

1,297,237.

Patented Mar. 11, 1919.

H. PETIT.
SPEED INDICATING DEVICE.
APPLICATION FILED AUG. 25, 1917.

1,297,237.

Patented Mar. 11, 1919.
9 SHEETS—SHEET 5.

H. PETIT.
SPEED INDICATING DEVICE.
APPLICATION FILED AUG. 25, 1917.

1,297,237.

Patented Mar. 11, 1919.
9 SHEETS—SHEET 8.

UNITED STATES PATENT OFFICE.

HENRI PETIT, OF ERMONT, FRANCE.

SPEED-INDICATING DEVICE.

1,297,237.  Specification of Letters Patent.  Patented Mar. 11, 1919.

Application filed August 25, 1917. Serial No. 188,240.

*To all whom it may concern:*

Be it known that HENRI PETIT, engineer of Villa Plaisance at Ermont, Department of the Seine-et-Oise, France, citizen of the French Republic, have invented certain new and useful Improvements in Speed-Indicating Devices; and I do hereby declare the following to be a full, clear, and exact description of the invention, such as will enable others skilled in the art to which it appertains to make and use the same.

The present invention has for its object to provide apparatus for indicating by a needle on a dial or graphically by curves the mean speed of a vehicle or of a rotating body.

Figure 1:
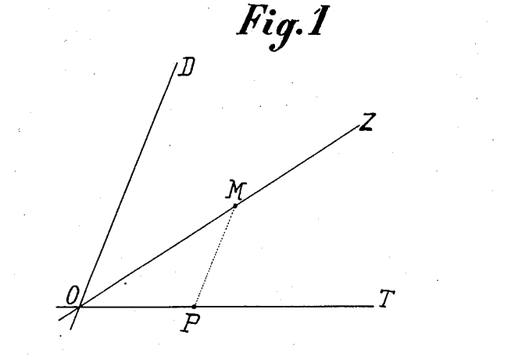
Fig. 1 is a geometrical diagram of the problem.
Figure 2:
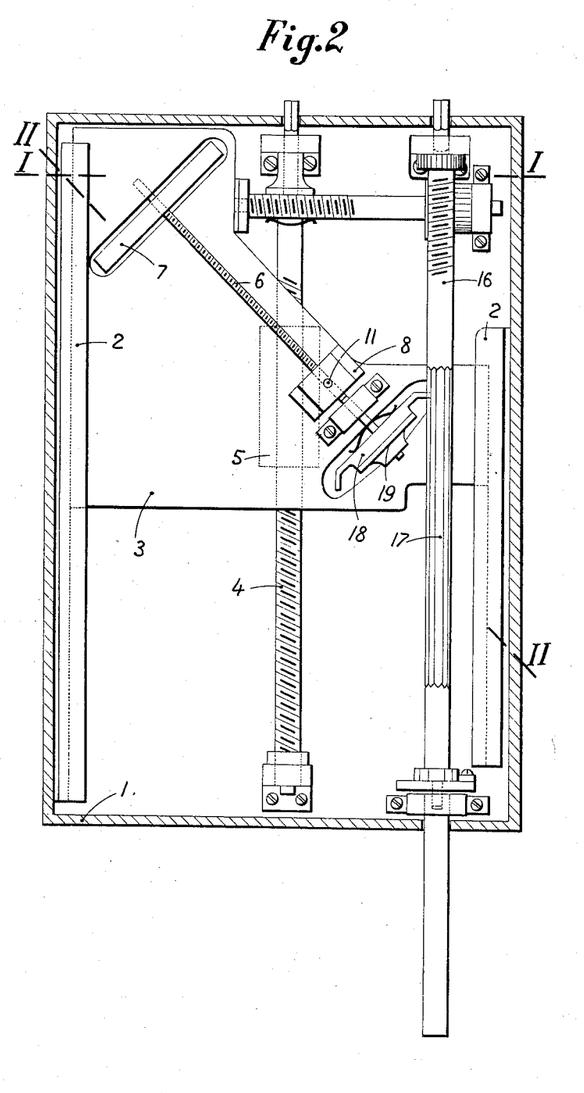
Fig. 2 is a view from above of a speed indicator by a needle on a dial constructed in accordance with the invention.
Figure 3:
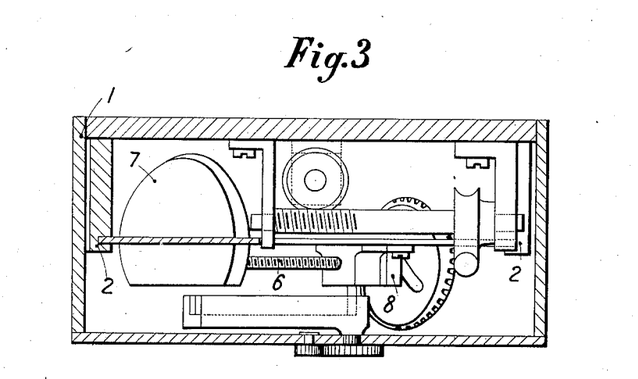
Fig. 3 is a vertical sectional view of the same taken on the line I—I of Fig. 2.
Figure 4:
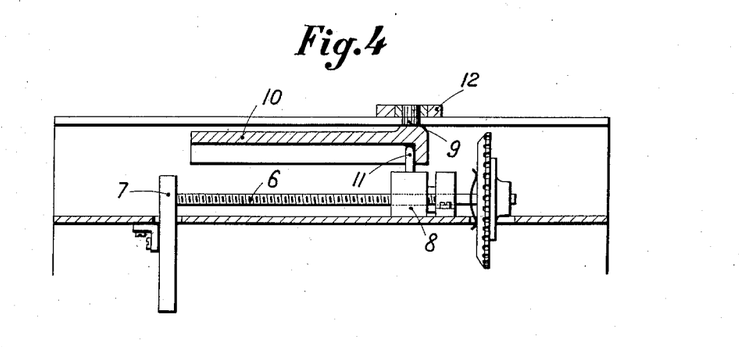
Fig. 4 is a vertical sectional view taken on the line II—II of Fig. 2.
Figure 5:
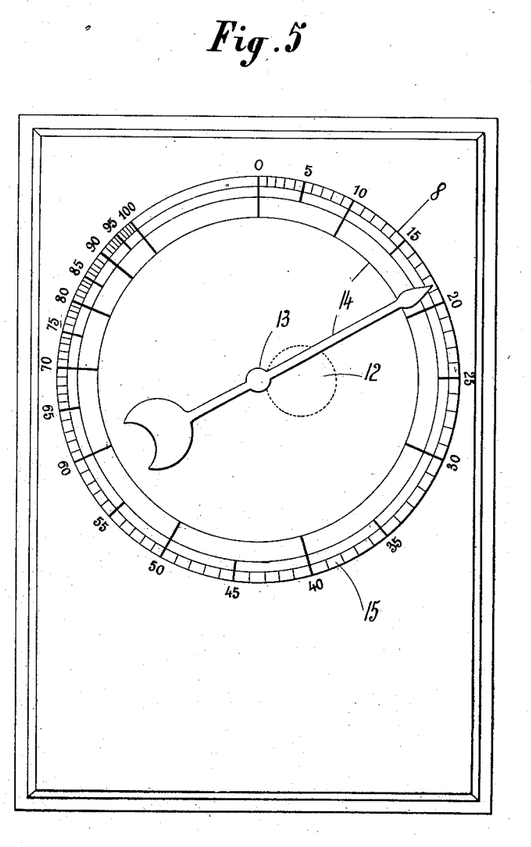
Fig. 5 is a front view of the indicator.

The apparatus indicating by a needle on a dial the mean speed in accordance with the invention is based on the following geometrical considerations: If there are (Figure 1) two coördinates O D and O T making an angle between them and a movable point M having as ordinates the distance traveled by the vehicle or the rotating body and as abscissæ the time T calculated from a given point of time, so long as the ratio $\frac{D}{T}$ and consequently the mean speed has a constant value, the point M will describe a line O Z passing through the point of origin.

To each speed therefore a line will correspond such as O Z passing through M and indicating approximately by its angle with the ordinate T the mean value of the speed for the point M.

The accompanying drawings show, by way of example, forms in which the invention may be carried into effect.

The indicator Figs. 2 to 5 comprises a frame or box 1, provided with two grooves 2 in which slides a movable plate 3 by the intermediary of an endless screw 4 passing through a nut 5 fast on the plate.

The rotation of the endless screw 4 is brought about by that of the rotating body, the mean speed of which it is desired to measure through the intervention of mechanical devices affording a suitable reduction in speed. Each part of the plate and of the mechanism carried by it therefore moves in a straight line proportionally to the speed of the shaft or of the vehicle. On the plate is mounted a second endless screw 6 connected with a clock movement represented diagrammatically at 7 and constituted either by a spring escapement or solely by an escapement for an object which will be hereinafter described. A nut 8 travels on the endless screw proportionally to the time which has passed since a given point of time coinciding in the example given in the drawing with the position of the nut represented in Fig. 2. The position of the line passing through a pivot 9 fixed to the base and through a point situated on the nut 8 in the axial plane of the screw 6 depends solely on the ratio $\frac{D}{T}$ that is to say on the mean speed of the moving body at the moment under consideration. For this purpose a rectilinear grooved member 10 is pivoted around the pivotal axis 9 coinciding with the point of origin and a finger 11 carried by the screw 8 enters this groove. The grooved member therefore takes up a position predetermined at each moment which is a function of the mean speed at the moment under consideration. The oscillations of this grooved member are amplified by means of a gear 12 engaging with the pinion 13 on which is mounted a needle 14 traveling over a dial 15 secured to the upper portion of the box 1.

Graduations may be marked on this dial corresponding to the mean speed expressed in a suitable manner.

In order to indicate the mean speed obtained taking account of stops, the apparatus may be slightly modified. The clockwork movement 7 has no spring and comprises simply a suitable escapement; movement is imparted to it by a shaft 16 having a fluted portion 17 entering into engagement with a toothed pinion 18 acting on the shaft 6 by means of a suitable sliding coupling indicated diagrammatically at 19. The pinion 18 will be engaged by the fluted shaft 17 whatever the position of the plate. The shaft 16 is driven through one of its extremities by means of a suitable coupling, as for example from the shaft or the wheel the speed of which it is desired to measure. As a result of this arrangement the escapement ceases to act when the vehicle or the rotating body is at rest.

The apparatus indicating graphically by curves the mean speed see Figs. 6 to 11 is based on the following geometrical considerations: A plane surface is displaced by a movement of translation or of rotation in its plane proportionally to the distance traveled by the vehicle or to the number of revolutions of the rotating body. In front of this plane a moving body is located traveling over a predetermined trajectory with any speed which is a function of the time.

If the moving body is furnished with a recording device it will trace on the plane surface a certain predetermined curve. This curve will depend, generally, on the value of the ratio of the movement of the surface to the movement of the moving body, that is to say, on the ratio $\frac{D}{T}$ where D represents the distance traveled by the rotating body and T the time calculated from a predetermined fixed point. By giving a succession of values to this ratio the corresponding curve can be described. In particular the curves may be described for which the ratio $\frac{D}{T}$ is constant and equal to a predetermined value; a set of curves may be obtained by varying the value of this ratio.

The mean speed at any point of the curve of the moving body may be readily ascertained by noting the values of the mean speeds in the neighborhood of the point under consideration and known from the curves of constant mean speed.

Figure 6:
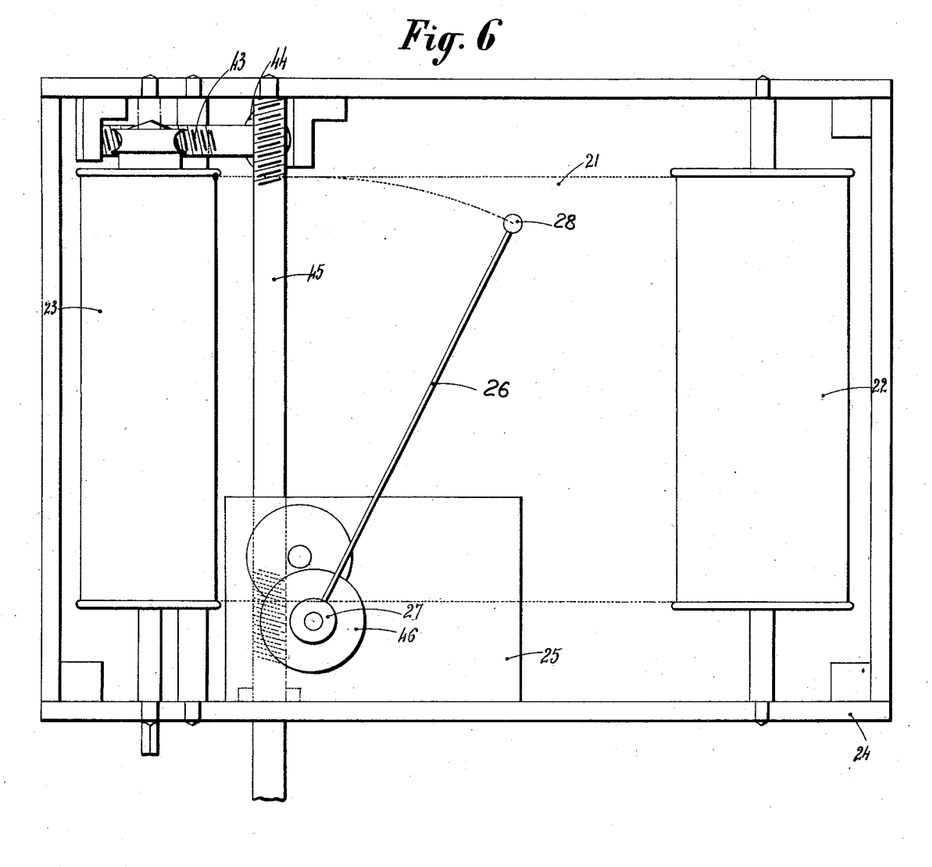
Fig. 6 is a plan view of an apparatus indicating graphically by curves the mean speed of a vehicle or of a rotating body.
Figure 7:
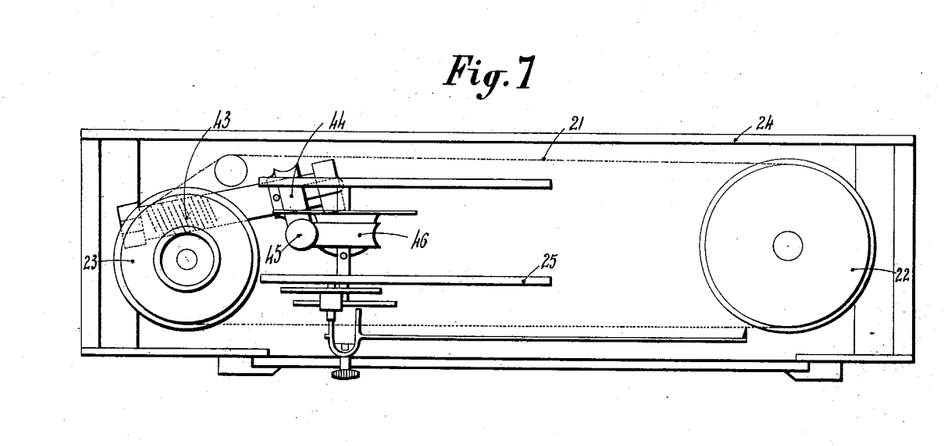
Fig. 7 is a vertical sectional view of the same.

In the apparatus illustrated in Figs. 6 and 7 an endless sheet 21 (indicated in dotted lines) is moved by two rollers 22 and 23 mounted in the casing 24 of the apparatus.

One of these rollers 23, for example, is moved at a speed proportional to that of the rotating body, the mean speed of which it is desired to ascertain so that the sheet itself is moved with a speed proportional to that body.

A clockwork movement 25 carrying a needle 26 pivoted at 27 and furnished with a recording device 28 at its extremity 29 describes an arc of a circle when the sheet 21 is motionless.

The curves corresponding to the constant ratio $\frac{D}{T}$ may be determined in advance on the paper band; to do this (see Fig. 8) an arc of a circle having a radius 27—28 is traced and parallel lines are drawn corresponding to the positions occupied by the needle 26 every half hour, for example. Starting from the positions of the needle, different distances are then marked corresponding to the travel of the band during the time under consideration, for example, to a mean speed of 20 miles an hour, 10 miles will be traveled during the first half hour, starting from the point 28 of the circle 27—28 corresponding to the ½ hour the distance traveled by the band when the body travels at 10 miles is marked, assuming that this distance is indicated by 29—30. If the speed is 30 miles, 15 miles is marked or 29—31, and so forth. The points corresponding to the speeds of 20, 30, 40 miles, etc., are determined in the same way on the time parallels for 1 hour, 1½ hour, 2 hours, 2½ hours, etc., and the constant speed curves 30—32, 31—33, etc., are described.

The sheet thus prepared is stretched on the rollers, the recording device is placed at the zero mark and the clockwork movement is put into operation.

Figure 8:
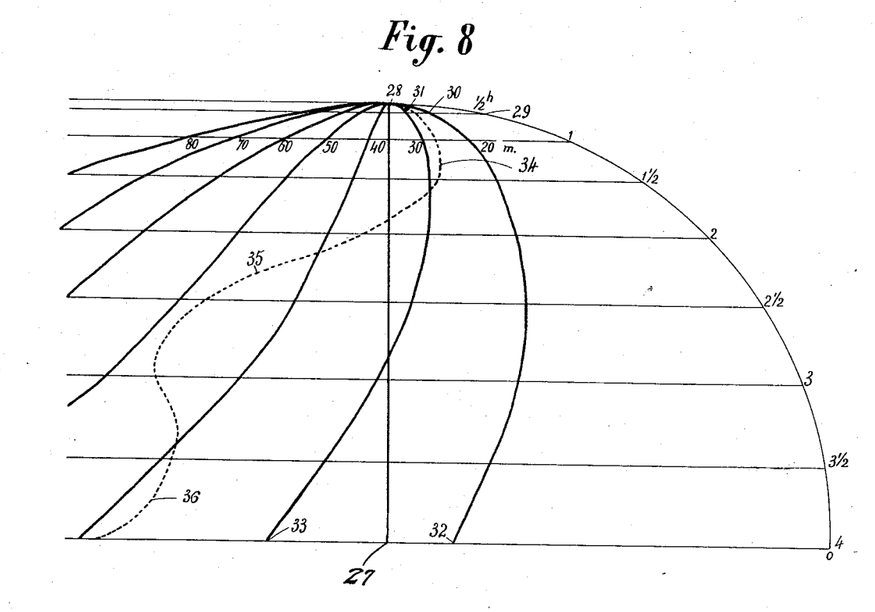
Fig. 8 shows a portion of the registering sheet and the curves of constant mean speed.

If it is assumed that the curve described is the curve 34—35—36 indicated in dotted lines on Fig. 8, it will be seen that the mean speed maintained for about the first 1½ hours is between 20 and 30 miles and that after 2 hours 10 minutes it has exceeded 40 miles, and that after about 2 hours 40 minutes it has attained a maximum of about 45 miles an hour. After 3½ hours it is again equal to 40 miles an hour. The diagram enables the exact mean speed to be obtained at any desired moment and enables it to be easily ascertained at what time a given speed, a maximum mean speed, has been reached.

Figure 9:
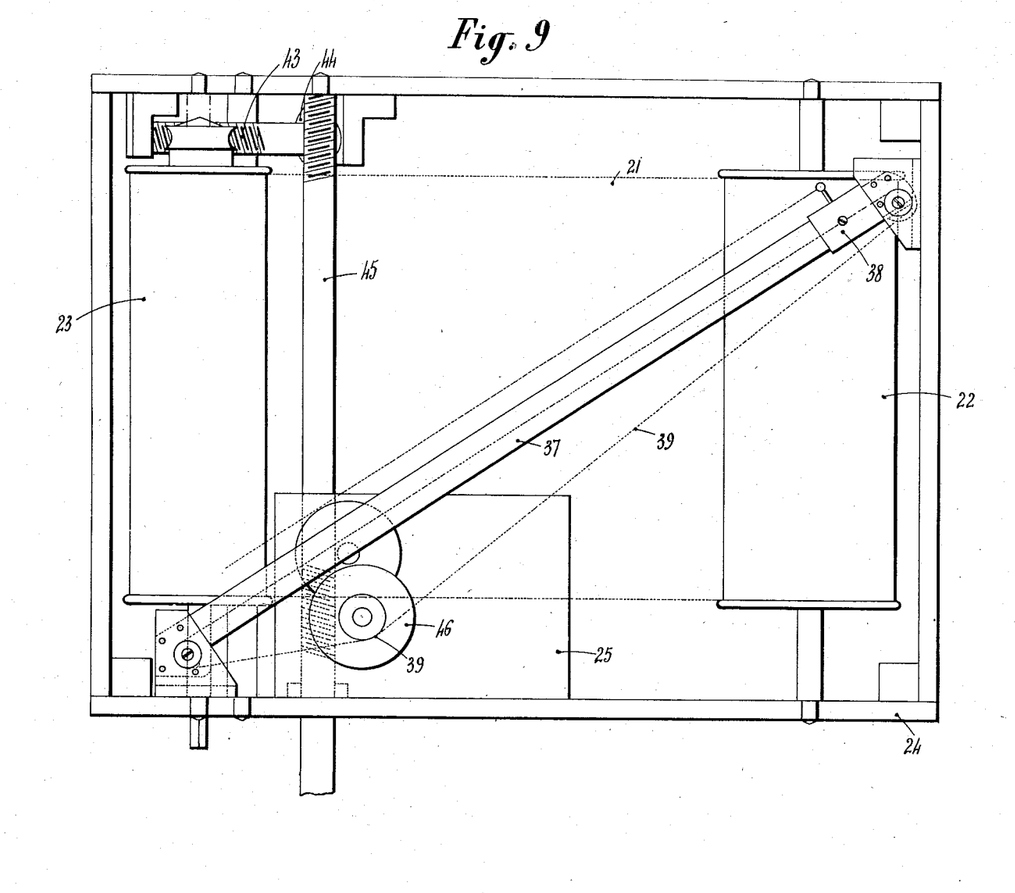
Figs. 9 and 10 are respectively a view from above and a vertical sectional view of a modified form.
Figure 10:
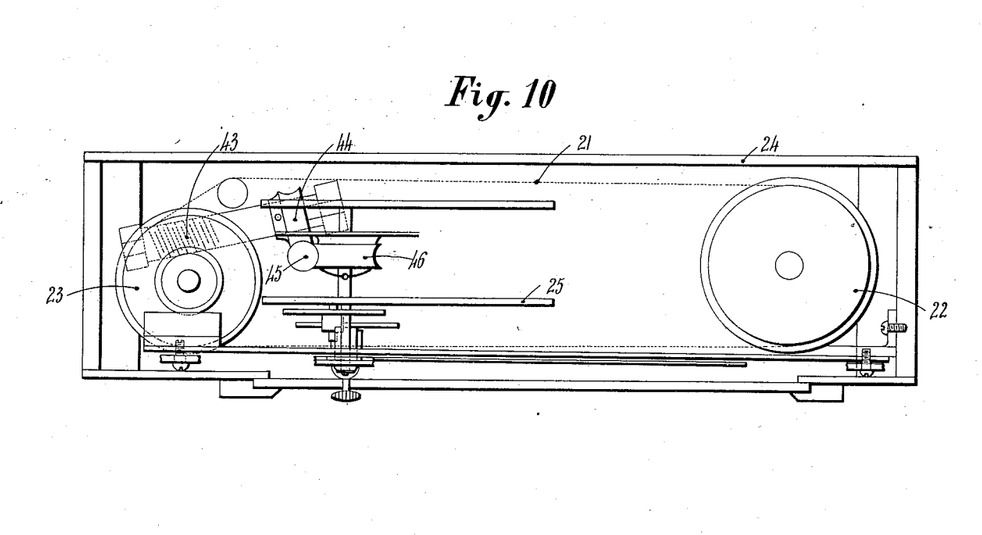

Figs. 9 and 10 show a modification in which the traveler driven by the clockwork movement moves in a straight line 37 instead of describing an arc of a circle. The recording device 38 sliding on the line 37 has a movement imparted to it by an endless belt running over one of the wheels 39 of the clockwork mechanism 25.

Figure 11:
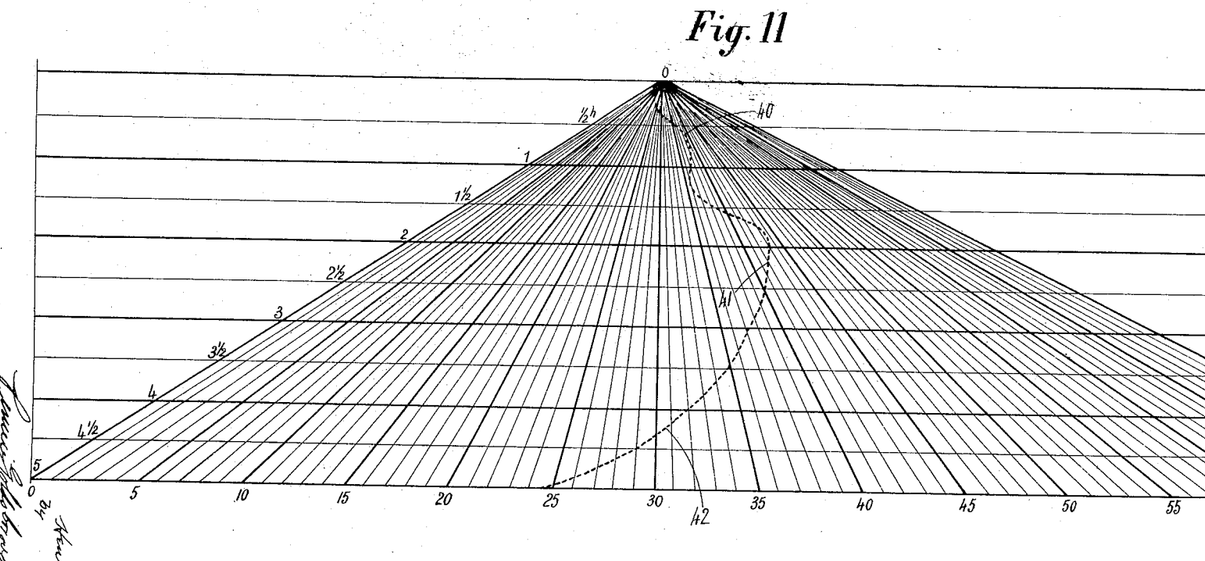
Fig. 11 represents a portion of the corresponding sheet.

In the diagram of Fig. 11 the arc of a circle of the diagram of Fig. 8 is replaced by a straight line containing half hourly divisions, the constant mean speed curves being formed by straight lines converging at the point O from which the times are taken.

If the recording device inscribes a curve 40—41—42 it may be ascertained in a manner similar to that described in connection with the diagram of Fig. 8 the different characteristics of the mean speed at each instant.

In order to indicate the mean speed obtained taking into account stops, one or other of the apparatuses may be slightly modified, the clockwork movement 25 being without a spring and driven by any mechanical means for example as shown in the drawings by an endless screw 43, a tangent wheel 44, a shaft 45 and a helical wheel 46, acting on the shaft of the clockwork mechanism with a suitable sliding coupling. The endless screw may be driven by means of a suitable transmission from the wheel of the vehicle or from the shaft the mean speed of which it is desired to measure. Due to this arrangement the escapement ceases to operate while the vehicle or the rotating body is at rest.

It is to be understood that the invention is not limited to the arrangements described and the right is reserved to apply the modifications in the selection of the curves traced by the recording device, this device being also capable of describing only such portion of said curves as may be the most advantageous for determining the speed by means of curves of constant speed.

I claim:

1. A mean speed indicator comprising a plate, means for imparting, to said plate, a movement of translation proportional to the speed of a rotating body, the mean speed of which it is desired to ascertain, a rotatable shaft, a finger carried by the shaft and moving in a straight line calculated from a given point of time, a pivoted member having a rectilinear groove therein in which said finger slides, the pivot point of said member coinciding with the position of the finger at zero time point, and an indicator of the mean speed associated with and operated by said finger.

2. A mean speed indicator comprising a plate, means for imparting to said plate, a movement of translation proportional to the speed of a rotating body, the mean speed of which it is desired to ascertain, a rotatable shaft, a finger carried by the shaft and moving in a straight line calculated from a given point of time, a pivoted member having a rectilinear groove therein in which said finger slides, the pivot point of said member coinciding with the position of the finger at zero time point, means for imparting motion to said finger including a longitudinally fluted shaft, an escapement on the shaft which carries the finger, said last mentioned shaft having a slidable coupling with the fluted shaft, and an indicator of the mean speed associated with and actuated by the finger.

In testimony whereof I affix my signature, in presence of two witnesses.

HENRI PETIT.

Witnesses:
 CHAS. P. PRESSLY,
 ALEXANDRE BERTHOLD.